(12) United States Patent
Kafzan et al.

(10) Patent No.: US 11,926,354 B2
(45) Date of Patent: *Mar. 12, 2024

(54) METHODS SYSTEMS DEVICES CIRCUITS AND FUNCTIONALLY RELATED MACHINE EXECUTABLE INSTRUCTIONS FOR TRANSPORTATION MANAGEMENT NETWORK CYBERSECURITY

(71) Applicant: Cervello Ltd., Tel Aviv (IL)

(72) Inventors: Shaked Kafzan, Tel-Aviv (IL); Roie Onn, Hod Hasharon (IL); Nadav Avidan, Netanya (IL); Eitam Aharon, Haifa (IL)

(73) Assignee: Cervello Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,489

(22) Filed: Dec. 30, 2021

(65) Prior Publication Data
US 2022/0126895 A1 Apr. 28, 2022

Related U.S. Application Data

(63) Continuation of application No. 16/378,889, filed on Apr. 9, 2019, now Pat. No. 11,247,706.
(Continued)

(51) Int. Cl.
*B61L 15/00* (2006.01)
*G06F 21/57* (2013.01)
(Continued)

(52) U.S. Cl.
CPC .......... *B61L 15/0018* (2013.01); *G06F 21/57* (2013.01); *H04L 41/0893* (2013.01);
(Continued)

(58) Field of Classification Search
CPC .. B61L 15/0018; G06F 21/57; H04L 41/0893; H04L 63/0263; H04L 63/1408; H04L 63/20; H04L 63/205
See application file for complete search history.

(56) References Cited

U.S. PATENT DOCUMENTS 7,019,637 B1 * 3/2006 Johnson ................. G08B 31/00
702/182
7,983,835 B2 7/2011 Lagassey
(Continued)

FOREIGN PATENT DOCUMENTS

WO   WO 2003097425 A1   11/2003
WO   WO 2008100148 A2   8/2008

OTHER PUBLICATIONS

Martin, L.J.W., Romanovsky, A. (2016). A Formal Approach to Designing Reliable Advisory Systems. In: Software Engineering for Resilient Systems. SERENE 2016.

*Primary Examiner* — Mohamed A. Wasel
(74) *Attorney, Agent, or Firm* — REINHOLD COHN & PARTNERS

(57) ABSTRACT

A cyber defense system for a computer managed transportation network having agents, each functionally coupled to an on-board controller of one of at least one transportation network vehicles. Each agent is adapted to monitor or regulate vehicle functional-change communications, sent to the on-board controller of its coupled vehicle from on-board controllers of other vehicles or from control units of the transportation network, in accordance with a respective transportation network vehicle policy file generated by an artificial intelligence node monitoring various vehicles of the transportation network.

19 Claims, 15 Drawing Sheets

Related U.S. Application Data

(60) Provisional application No. 62/730,559, filed on Sep. 13, 2018, provisional application No. 62/679,991, filed on Jun. 4, 2018, provisional application No. 62/668,825, filed on May 9, 2018, provisional application No. 62/654,558, filed on Apr. 9, 2018.

(51) Int. Cl.
  *H04L 9/40* (2022.01)
  *H04L 41/0893* (2022.01)

(52) U.S. Cl.
  CPC ...... *H04L 63/0263* (2013.01); *H04L 63/1408* (2013.01); *H04L 63/20* (2013.01); *H04L 63/205* (2013.01)

(56) References Cited

U.S. PATENT DOCUMENTS

| | | | |
|---|---|---|---|
| 11,247,706 B2* | 2/2022 | Kafzan | B61L 15/0018 |
| 11,332,175 B2* | 5/2022 | Shifman | B61L 27/70 |
| 2009/0079560 A1 | 3/2009 | Fries | |
| 2010/0023598 A9 | 1/2010 | Ginte | |
| 2015/0232110 A1* | 8/2015 | Ghaly | B61L 27/20 |
| | | | 246/62 |
| 2016/0050222 A1 | 2/2016 | Iyer | |
| 2017/0093885 A1* | 3/2017 | Houmb | G06F 21/57 |
| 2018/0222505 A1* | 8/2018 | Chung | B61L 27/14 |
| 2019/0312781 A1* | 10/2019 | Kafzan | H04L 41/0894 |
| 2021/0058409 A1* | 2/2021 | Shmueli | B61L 23/04 |

* cited by examiner

METHODS SYSTEMS DEVICES CIRCUITS AND FUNCTIONALLY RELATED MACHINE EXECUTABLE INSTRUCTIONS FOR TRANSPORTATION MANAGEMENT NETWORK CYBERSECURITY

RELATED APPLICATIONS SECTION

The present application is a Continuation of U.S. Utility patent application Ser. No. 16/378,889, filed Apr. 9, 2019. The Ser. No. 16/378,889 Utility Application claims priority from: U.S. Provisional Patent Application No. 62/654,558, filed Apr. 9, 2018; U.S. Provisional Patent Application No. 62/668,825, filed May 9, 2018; U.S. Provisional Patent Application No. 62/679,991, filed Jun. 4, 2018; and U.S. Provisional Patent Application No. 62/730,559, filed Sep. 13, 2018. All of which applications are hereby incorporated by reference in their entirety.

FIELD OF THE INVENTION

The present invention generally relates to the fields of cybersecurity and, of Information Technology (IT) and Operational Technology (OT) network security. More specifically, the present invention relates to methods, systems, devices, circuits and functionally related machine executable instructions for cybersecurity of transportation management networks, such as, but not limited to, PTC (Positive Train Control) and/or ETCS (European Train Control System) railway signaling systems.

BACKGROUND

Railway signaling systems are used to direct railway traffic and keep trains clear of each other at all times. Railway infrastructures are moving towards more intelligent, connected and collaborative systems.

As railways increase efficiencies through automation and digitization—by moving from strictly mechanical systems and standalone systems to digital, open-platform and standardized equipment—they become more vulnerable to cyberattacks through a nearly unlimited number of attack vectors.

As a result, the OT environment is no longer considered to be a closed network, meaning, from now on any component in the OT network has the ability to be hacked and manipulated in a way which could cause serious damage to the railway operation.

Modern rail systems have highly specific control & safety technology infrastructures implemented with signaling technology. The signaling technology includes electronic interlocking, radio/cellular-based signaling systems, such as the European Train Control System (ERTMS) and the Positive Train Control systems (PTC), and designated mobile-radio standards to which hackers cannot simply gain access.

Nonetheless, these complex technologies are able to operate only because of their integration into the Internet-based data communication system and the fact they all run via corresponding servers just like any other application. In such vulnerable environments—the risk of cyberattacks, interventions, and intrusions from different unauthorized parties, has become increasingly high.

There remains a need, in the fields of cybersecurity and of Information Technology (IT) and Operational Technology (OT) network security, for cybersecurity solutions that secure the operation of, and the communication between, the different endpoints of a transportation network in a way which provides protection to the railway network.

SUMMARY OF THE INVENTION

Embodiments of the present invention include methods, systems, devices, circuits and functionally related machine executable instructions for transportation management network cybersecurity.

According to embodiments of the present invention, there may be provided a set of one or more agents, coupled to respective transportation management network units, adapted to each collect and relay signals/data-streams indicative of the units' recent activity and/or recent/current operation state(s)/status(es).

A behavior monitoring server may receive—from some or all of the set of transportation management network agents—and store, the signals/data-streams indicating their respective activity and/or status(es).

A unit policy generation module/server may generate expected behavior policy(ies)/profile(s) for at least some of the transportation management network units—based on the signals/data-streams received by the behavior monitoring server and/or based on data, from one or more resources, indicative of the transportation network's activity. A generated policy may be relayed-to/shared-with its respective agent and optionally with one or more other agents of the transportation management network, associated with the policy-generated/profiled unit.

According to some embodiments, cyber-event detection logics—each associated with a system unit monitoring agent—may compare one or more of the relayed unit policies to actual/current/real-time behavior of the same network units, and may associate a potential malicious activity, malware or cyber-event—with one or more anomalies or mismatches detected between, a network unit behavioral policy and the actual/current/real-time behavior of the same profiled network unit.

According to embodiments, transportation management network units monitored by system agents, may include, but are not limited to, any combination of: a control center, radio block control units, network car/locomotive onboard units; and/or network wayside units.

According to embodiments, system 'agents', as described herein, may take the form of, or be implemented as: a software agent/application; a dedicated function embedded system; a system on chip (SoC); a multi-function processor, processing-unit, computer or server; and/or any software and/or hardware combination of the above listed system/component/module types.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

Figure 1:
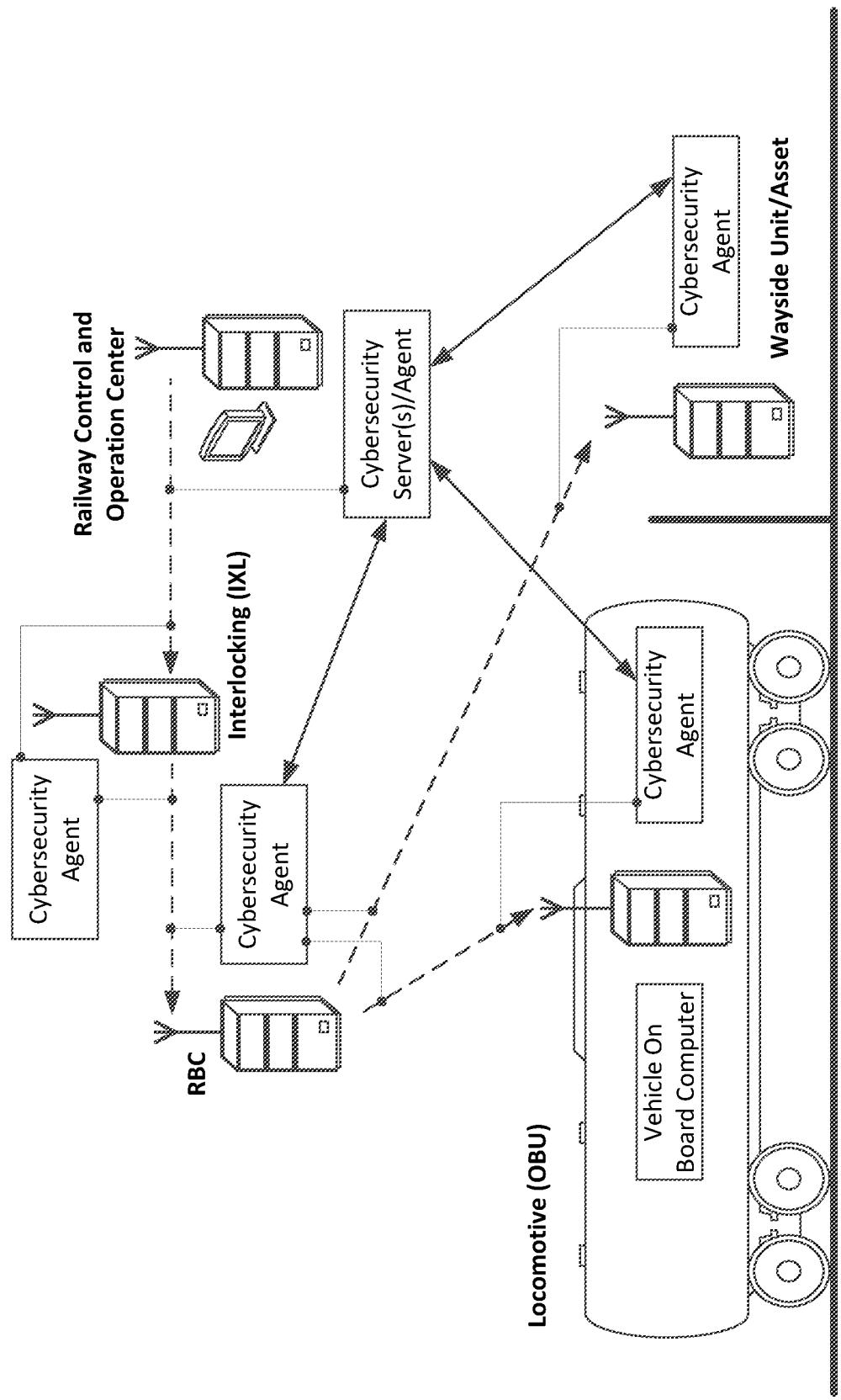
In FIG. 1, there is shown, in accordance with some embodiments of the present invention, a topology of an exemplary system for cybersecurity of transportation management networks, including the main units of the transportation management network and the components/agents of the cybersecurity system functionally associated therewith.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Functions, operations, components and/or features described herein with reference to one or more embodiments, may be combined with, or may be utilized in combination with, one or more other functions, operations, components and/or features described herein with reference to one or more other embodiments, or vice versa.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "includes", "including", "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention, and is not intended to limit the invention to the specific embodiments illustrated by the figures or description below.

Unless specifically stated otherwise, as apparent from the following discussions, it is appreciated that throughout the specification discussions utilizing terms such as "processing", "computing", "calculating", "determining", or the like, may refer to the action and/or processes of a computer, computing system, computerized mobile device, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device, for example a computerized device running a web-browser.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. The memory elements may, for example, at least partially include memory/registration elements on the user device itself.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Throughout the specification, discussions utilizing terms such as "circuit", "circuits", "circuitry", or the like, may refer to any type or combination of hardware, firmware and/or software based signal/data processing logic—known today, or to be devised in the future. In the following descriptions and the accompanying figures—these terms may be used interchangeably.

Lastly, the solutions, techniques and examples, in the following detailed description, are generally described in the context of providing cybersecurity to a transportation management system and more specifically to railway management and signaling systems. This however, is not to limit the teachings herein, all or some of which may be likewise applicable to the digital and cyber security and protection of various transportation related, and/or non-transportation related, control/management networks and systems.

Embodiments of the present invention include methods, systems, devices, circuits and functionally related machine executable instructions for transportation management network cybersecurity.

According to embodiments of the present invention, there may be provided a set of one or more agents, coupled to respective transportation management network units, adapted to each collect and relay signals/data-streams indicative of the units' recent activity and/or recent/current operation state(s)/status(es).

A behavior monitoring server may receive—from some or all of the set of transportation management network agents—and store, the signals/data-streams indicating their respective activity and/or status(es).

A unit policy generation module/server may generate expected behavior policy(ies)/profile(s) for at least some of the transportation management network units—based on the signals/data-streams received by the behavior monitoring server and/or based on data, from one or more resources, indicative of the transportation network's activity. A generated policy may be relayed-to/shared-with its respective agent and optionally with one or more other agents of the transportation management network, associated with the policy-generated/profiled unit.

According to some embodiments, cyber-event detection logics—each associated with a system unit monitoring agent—may compare one or more of the relayed unit policies to actual/current/real-time behavior of the same network units, and may associate a potential malicious activity, malware or cyber-event—with one or more anomalies or mismatches detected between, a network unit behavioral policy and the actual/current/real-time behavior of the same profiled network unit.

According to some embodiments, transportation management network units monitored by system agents, may include, but are not limited to, any combination of: a control center, interlocking (IXL) units, radio block control units, network car/locomotive onboard units; and/or network wayside units.

According to some embodiments, system 'agents', as described herein, may take the form of, or be implemented as: a software agent/application, a dedicated function embedded system, a system on chip (SoC), a multi-function computer or server and/or any software and/or hardware including combination of the above listed computing system/component types, or any computing system/component type to be devised in the future.

According to some embodiments, the cybersecurity agents described in any of the embodiments herein, may use deep-packet inspection for network packets to detect malicious activity or exploits—such as protocol vulnerabilities, operating system vulnerabilities and more.

According to some embodiments of the present invention, one or more agent/client components of a system for cybersecurity of a transportation signaling/management network may be functionally associated with corresponding units of the transportation signaling/management network.

According to some embodiments, transportation signaling/management network data resources, such as a train management and scheduling information, may be utilized to generate operational and informational policies for some or all of the signaling network's units.

According to some embodiments, the operational and informational functionality characteristics of the transportation signaling/management network units, may be monitored. Collected, units' functionality characteristics data may be processed to generate operational and informational policies for some or all of the signaling network's units.

Signaling network units' functionality characteristics data may, for example, include: Operation Technology (OT) data—e.g. intermittent operational statuses of units; and/or, Information Technology (IT) data—e.g. data transfer parameters of units' communications and/or data content parameters collected from within units' communications. For example, the control center of the transportation signaling/management network—a computer-based command and control—may send commands, to OT (Operation Technology) equipment/elements/devices, such as signal heads and point machines. For example, a 'green light' command from the control center computer to an embedded signal head device of a transportation network unit.

According to some embodiments, cybersecurity system agents, may be functionally associated with, and monitoring/listening-to real time communication of, the signaling network units. Real time communication characteristics and content, of a given unit, may be compared—by an event detection server of the cybersecurity system and/or by event detection logics of the specific system agents—to the operational and informational policy generated for that specific signaling network unit.

If the real time communication characteristics and/or content, of the given unit, are found not match one or more its corresponding unit-policy related thresholds/rule-sets/schemes, a cyber-event detection may be determined.

In response to a cyber-event detection, the system may: issue notifications to signaling network systems and/or personal; issue direct operational commands to controllers of specific units of the signaling networks (e.g. sideway units); and/or trigger the execution of additional detection verification processes, for example, real time comparison to additional policy segments may be executed, and/or the system may check if the detected cyber-event is specific to one specific unit/equipment (on which it was first detected) or is the event entire system, or system sector, wide.

Reference is now made to FIG. 1, where there is shown, in accordance with some embodiments of the present invention, a topology of an exemplary system for cybersecurity of transportation management networks, including the main units of the transportation management network and the components/agents of the cybersecurity system functionally associated therewith.

In the figure, there are shown railway signaling system units, including: (1) a Control Center, including a combination of: an Operation Management Center (OMC). a Back Officer Server (BOS), a Train Management System (TMS), and/or any additional Components in charge of controlling and operating the units and components (e.g. critical endpoints) in the signaling system; (2) an Interlocking (IXL) Unit; (3) a Radio Block Control (RBC), communicating with and relaying commands to, and information from: (4) a Vehicle On-Board Controller (VOBC)/Locomotive On-Board Unit (OBU) and (5) a Wayside Unit, or any device, optionally having computer processing and code execution abilities, positioned next to or on the railroad (e.g. balise, gate, traffic light).

Shown cybersecurity system components and agents, corresponding to the shown railway signaling system units, include: (1) a Cybersecurity System Server(s) (CSS) for monitoring railway control center activity and/or for analyzing agents collected data in order to generate policies and detect cyber threats in the signaling system network; (2) an Interlocking Unit Agent; (3) a Cybersecurity Radio Block Controls (RBC) Agent; (4) a Cybersecurity On Board Unit (OBU) Agent; and (5) a Cybersecurity Wayside Unit Agent.

Each of the cybersecurity agents—CSS, RBC, OBU and Wayside Unit—monitors the communication characteristics and content, of its respective signaling network unit, and relays the collected data to the Cybersecurity System Server(s).

The Cybersecurity System Server(s), and/or any additional or other system server(s), monitors the communication characteristics and content of the signaling network Railway Control Center, for policy generation purposes and/or for alert detection based on comparison to later collected real time Railway Control Center data.

According to some embodiments of the present invention, a railway signaling system—used to control railway traffic, to prevent trains from colliding and to adjust distance and the speed for proper braking time and management of tracks—may include four main critical components: on-board units, wayside units, RBCs (Radio Block Controls) and BOS (Back Office Server)/Control centers. These components may be communicatively connected using wired or wireless communication and may be vulnerable to many different vectors of cyber-attacks. According to some embodiments, system agent components, implementing a cybersecurity solution, may be installed-onto/functionally-associated-with some or all of the units of the railway signaling system and may secure critical assets by analyzing the traffic and communication between the different, or similar, assets to detect, and optionally to classify and/or provide remedies for, cyber threats in the signaling network.

Figure 2A:
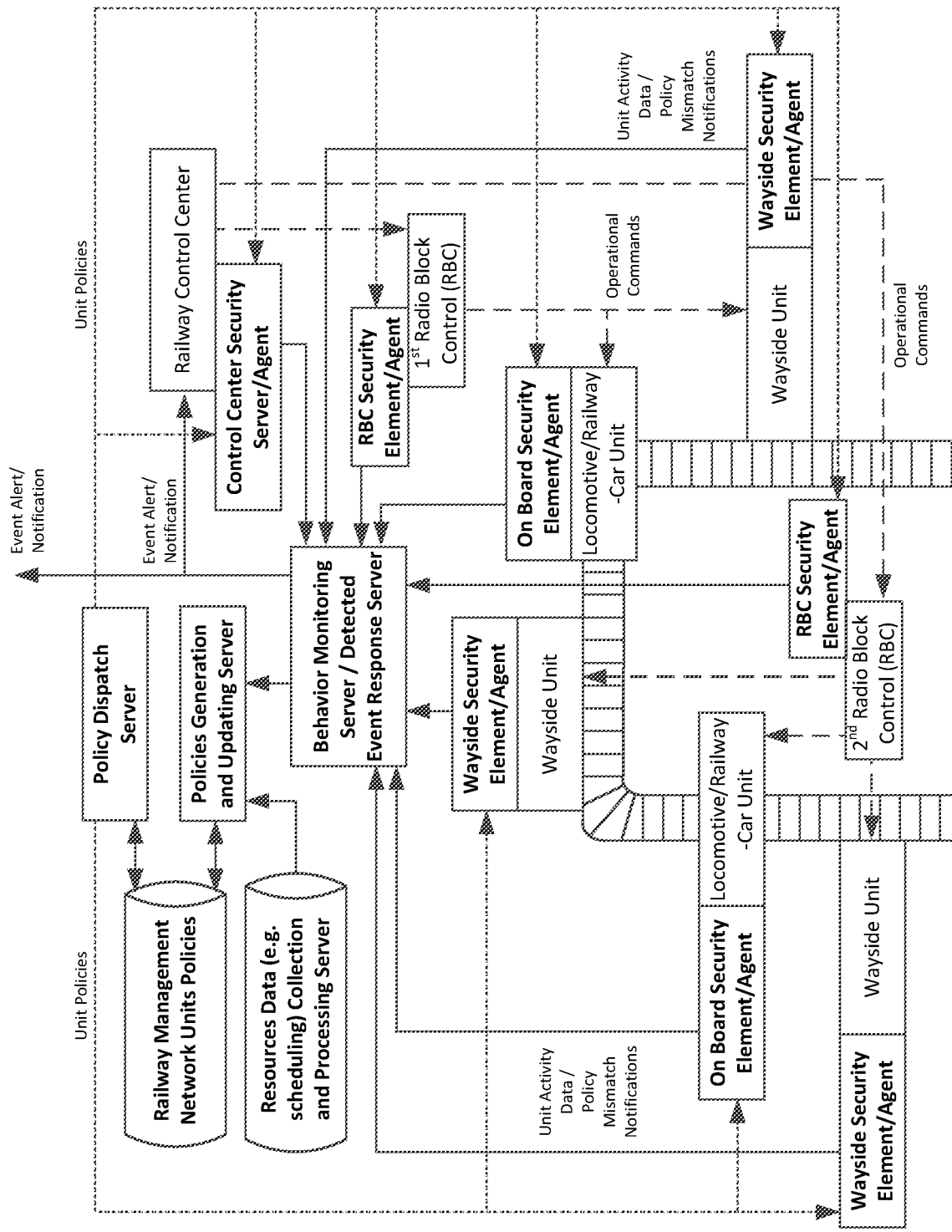
In FIG. 2A, there is shown, in accordance with some embodiments of the present invention, a schematic layout of an exemplary system for cybersecurity of transportation management networks, including the main units of the transportation management network and the components and server modules of the cybersecurity system functionally associated therewith, wherein the communication between the components and server modules of the cybersecurity system is performed over a separate/distinct network of communication channels that is independent of the transportation management network.

Reference is now made to FIG. 2A, where there is shown, in accordance with some embodiments of the present invention, a schematic layout of an exemplary system for cybersecurity of transportation management networks, including the main units of the transportation management network and the agent components and server modules of the cybersecurity system functionally associated therewith, wherein the communication between the agent components and server modules of the cybersecurity system is performed over a separate/distinct network of communication channels that is independent of the transportation management signaling network.

In the figure, cybersecurity system agents are shown to be monitoring respective railway signaling network units.

Unit functionality characteristics data, collected by each of the agents is relayed to a unit behavior monitoring server, receiving information from all deployed/active cybersecurity system agents. A Policy generation and updating server utilizes agents collected data from the behavior monitoring server, and/or one or more railway network related data resources (e.g. published train scheduling data), to generate and update operational and informational/communicational policies for the signaling network units.

Real time, or substantially real time, units functionally characteristics data, is intermittently received and relayed by the behavior monitoring server to a cyber-event detection server, to be compared to signaling network units policies, of units from which real time data has been received.

A mismatch between the real time behavior of a specific unit, or a specific set of units, and its/their policy-based expected behavior, triggers a cyber-event detection determination/estimation by the cyber-event detection server. A notification(s), an alert, a detected cyber-event classification process and/or the relaying of one or more operational commands to signaling network unit(s) associated with the determined cyber-event—may be triggered in response to a detected cyber event.

In the exemplary figure, communication channels between the signaling network railway control center and the signaling network units are shown in broken lines. Communications to/from the railway control center are relayed to one of the two RBCs shown—$1^{st}$ RBC and $2^{nd}$ RBC—and from/to each of the two RBCs to a respective set of signaling network units associated therewith.

Communications between the cybersecurity system agents and the behavior monitoring server of the system— and between the behavior monitoring, policy generation and cyber-event detection servers of the system—are conducted over a separate communication network having a different set of communication channels, shown in full lines.

Communications from the policy dispatch server, relaying generated signaling network unit policies and policy updates to corresponding unit agents—are likewise conducted over a separate communication network (from the signaling network) having a different set of communication channels— which separate network may or may not be the same network used by the cybersecurity system agents and servers. Unit policy dispatch/distribution channels are shown dotted lines.

Figure 2B:
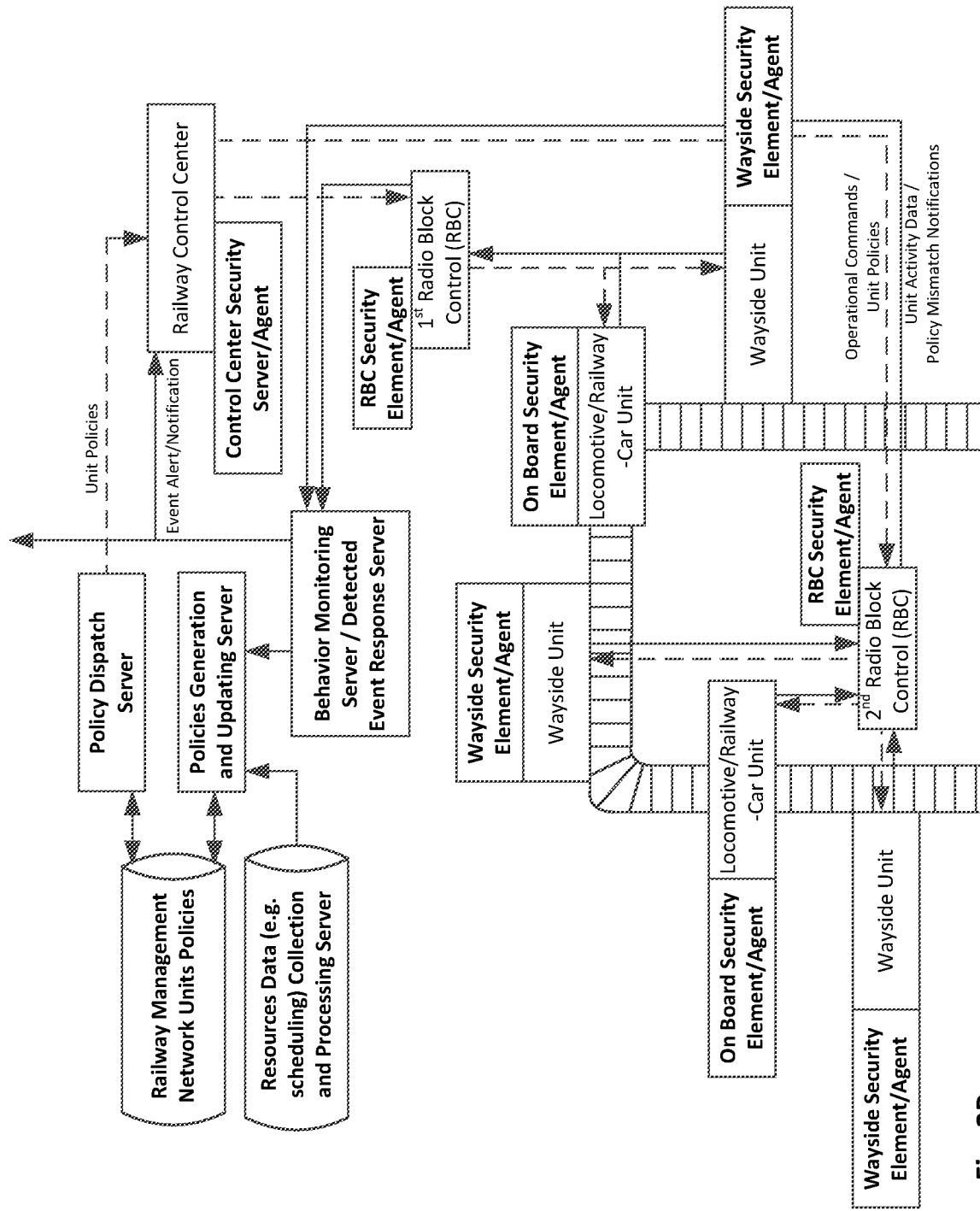
In FIG. 2B, there is shown, in accordance with some embodiments of the present invention, a schematic layout of an exemplary system for cybersecurity of transportation management networks, including the main units of the transportation management network and the components and server modules of the cybersecurity system functionally associated therewith, wherein the communication between the components of the cybersecurity system is performed over communication channels of the transportation management network.

Reference is now made to FIG. 2B, where there is shown, in accordance with some embodiments of the present invention, a schematic layout of an exemplary system for cybersecurity of transportation management networks, including the main units of the transportation management network and the agent components and server modules of the cybersecurity system functionally associated therewith, wherein the communication between the agent components and server modules of the cybersecurity system is performed over a communication channels of the transportation management signaling network.

Communications between the cybersecurity system agents and the behavior monitoring server of the system— and optionally between the behavior monitoring, policy generation and cyber-event detection servers of the system—are conducted over the communication channels of the transportation management signaling network, sharing channels/bandwidth with communications between the signaling network railway control center and the signaling network units—all of which communication channels are shown in the figure in full lines.

According to some embodiments of the present invention, a control center—in charge of controlling and operating the critical assets in the signaling system—may include two main parts: one or more dispatch centers for relaying operation instructions to the units/assets of the signaling system and/or for receiving operational status related information from them; and, a user interface that enables users/administrators access, control and operation of the signaling assets and the CBI (Computer-Based Interlocking) system, of the BOS/OMC (Operation Management Center), that manages the safety of the signaling system.

System unit(s), implementing a cybersecurity solution, may be installed-onto/functionally-associated-with/implemented-in the BOS/OMC (control center) and may analyze the incoming and outgoing communication to detect cyber threats in the signaling system.

Figure 3:
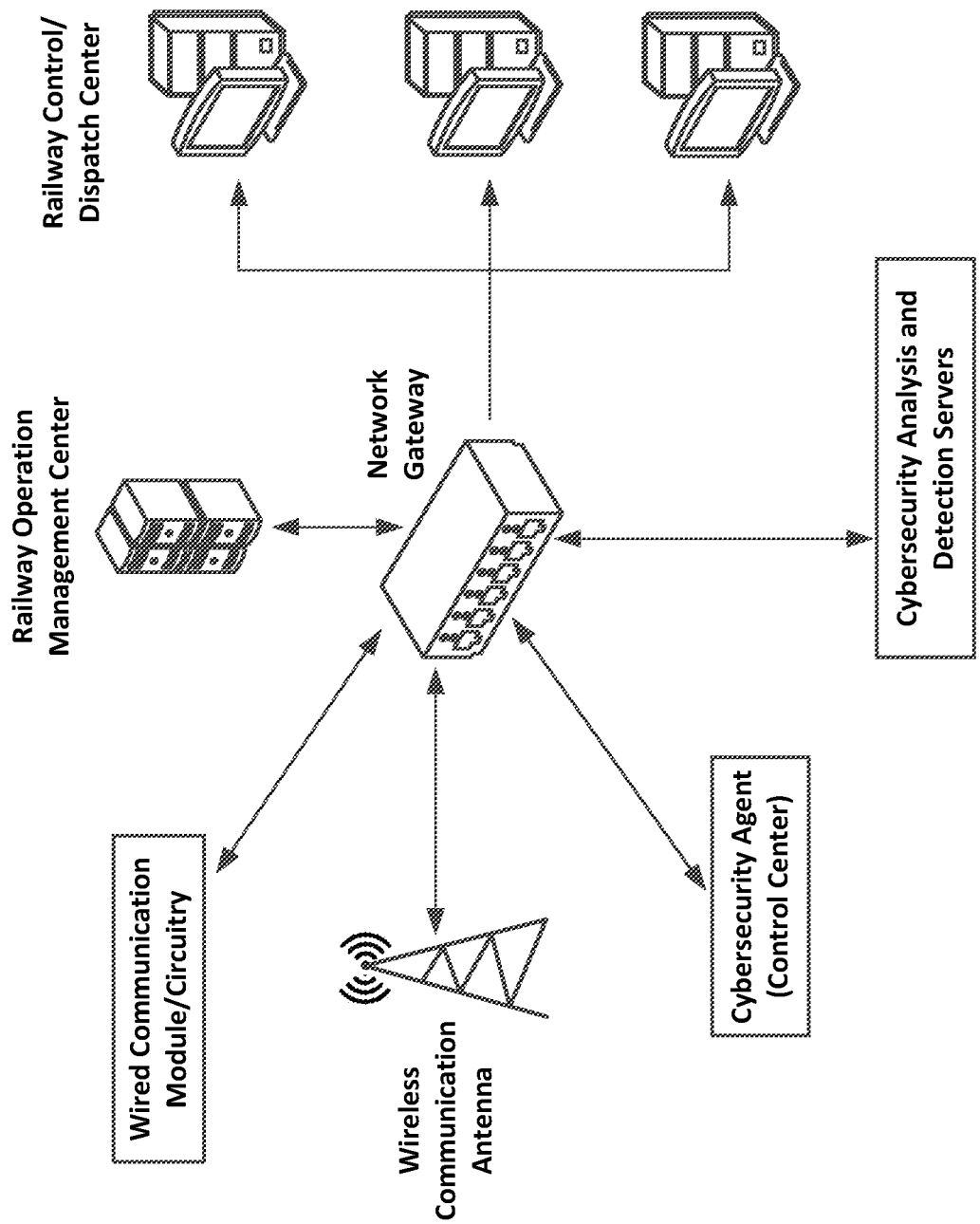
In FIG. 3, there is shown, in accordance with some embodiments of the present invention, a schematic layout of the main parts of a railway control center and the components and server modules, of an exemplary cybersecurity system, functionally associated with the railway control center.

Reference is now made to FIG. 3, where there is shown, in accordance with some embodiments of the present invention, a schematic layout of the main parts of a railway control center and the components and server modules, of an exemplary cybersecurity system, functionally associated with the railway control center.

In the figure, there are shown: a wireless antenna (e.g. GSM-R, GSM, Tetra, or any wireless channel) for transmitting and receiving communication signals to and from the railway control center of the signaling system; a cybersecurity system agent monitoring control center communications to detect cyber-events; a network gateway through which control center communications are sent and received; a railway control center—e.g. Railway Operation Management Center (OMC)/Back Officer Server (BOS)/Train Management System (TMS)/and/or Server—Components in charge of controlling and operating the units of, and critical endpoints in, the signaling network; Cyber security system server which analyzes data from different resources/system-agents (e.g. using: rule-sets, machine learning, artificial intelligence (AI), deep learning (DL) algorithms) in order to detect cyber events/threats in the signaling system; and Dispatch centers (also known as control centers) responsible for operating all of the operational units/assets in the signaling network.

According to some embodiments of the present invention, wayside units may include parts of the signaling system that connect various wayside equipment types to the signaling network. Wayside equipment types, may for example include: signals, switches, and/or control devices for railroad operations, which are located on, along and/or in proximity to the railroad tracks. The wayside units may receive commands from the signaling network (e.g. from the control/operation center) and transmit data back to the network.

For example, wayside balises may connect to the network through wayside units and receive speed limits, which they then send to a corresponding train when it passes the balise. System agents, implementing a cybersecurity solution, may be installed-onto/functionally-associated-with/implemented-in/connect-to the wayside unit and processes the incoming and outgoing data to secure and ensure validity and to understand the integrity of each command, based on the policies and profiles it received from the cybersecurity system server.

Figure 4:
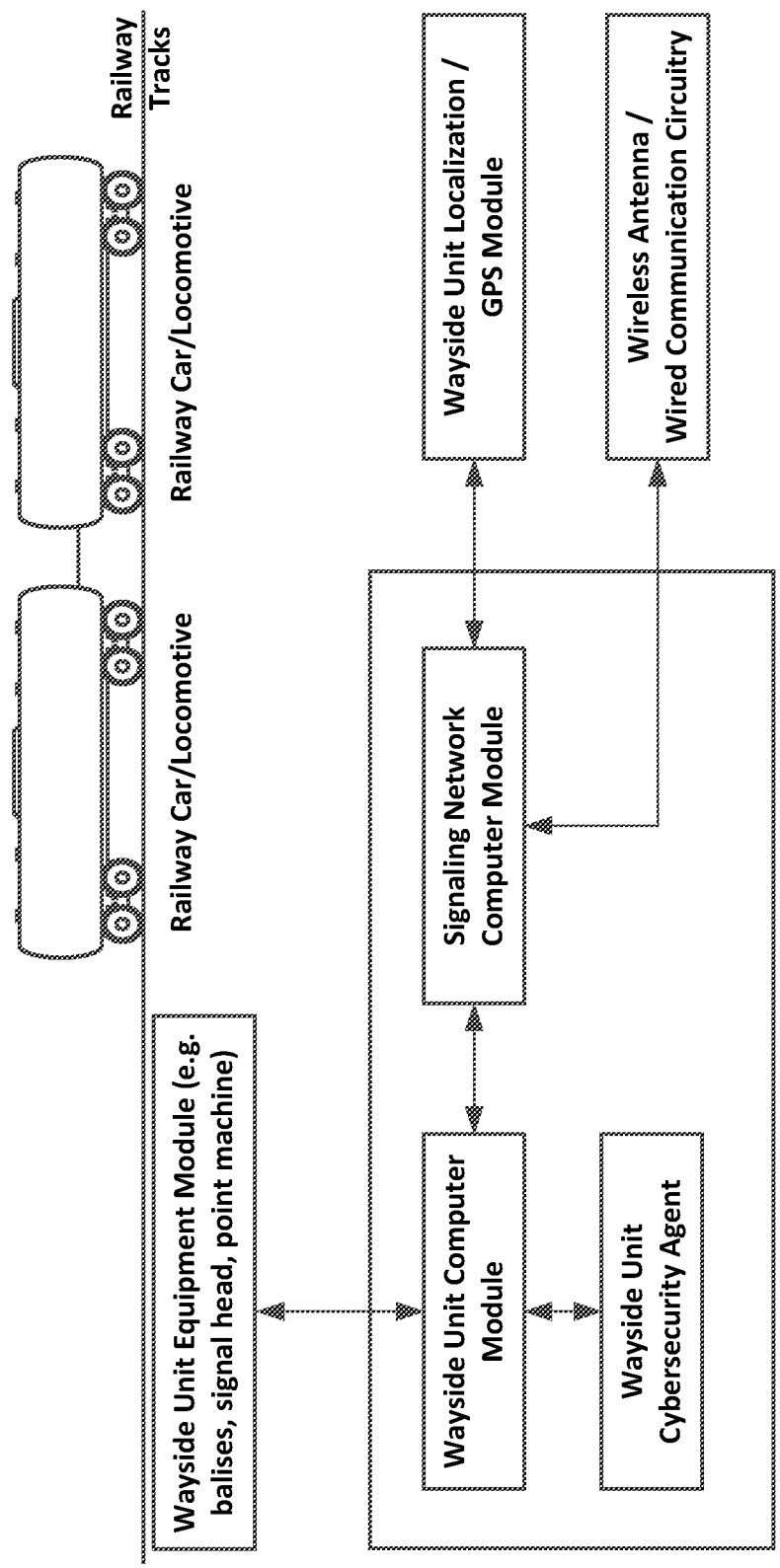
In FIG. 4, there is shown, in accordance with some embodiments of the present invention, a schematic layout of the main parts of a railway wayside unit and the components, of an exemplary cybersecurity system, functionally associated with the wayside unit.

Reference is now made to FIG. 4, where there is shown, in accordance with some embodiments of the present invention, a schematic layout of the main parts of a railway wayside unit and the components, of an exemplary cybersecurity system, functionally associated with the wayside unit.

In the figure, there are shown: a Wayside unit equipment (any device on/next-to/in-proximity-of the railroad tracks, e.g. balises, signal head, point machine); Railway cars or locomotives; Railroad tracks; a Computer unit or module connecting the wayside equipment unit with the signaling network; a cybersecurity system agent for monitoring wayside unit communications (e.g. traffic) and comparing, or relaying for server comparison, real-time network behavior characteristics (e.g. communication traffic) to policy-based, estimated/determined/predicted network behavior characteristics (e.g. communication traffic) of the wayside unit, wherein comparison process mismatch(es) may be utilized to detect anomalies or malicious activities inside the signaling network and alert/notify on a cyber-event (e.g. attack); a Signaling systems computer module—such as PTC, ETCS, CBTC, or any other signaling system type; and a GPS, or any other location device, for locating an indicating the position of the wayside unit, within the railway signaling system.

According to some embodiments of the present invention, along the railroad tracks, wayside units may collect data and transmit it to: a control center, an RBC and/or to onboard units (e.g. by eurobalises). The onboard units may each consist of several parts, including: an onboard computer that monitors and calculates the maximum speed and the breaking curve of the train; and the onboard unit that connects to the signaling network and receives data from the different wayside units and the control center, thereby connecting the wayside equipment to the signaling network. Wayside equipment—the signals, switches, and/or control devices for railroad operations located along the railroad tracks—may receive commands from the signaling network (e.g. the control/operation center) and transmit data back to the network.

For example, balises may connect to the network and receive speed limits, which they may then send to the train passing when it passes the balise. The cybersecurity system onboard agent connects to the onboard unit and processes the incoming and outgoing data to secure and ensure validity and to understand the integrity of each command, based on the policies and profiles it received from the cybersecurity system server.

According to some embodiments, a given onboard computer may continuously/intermittently monitor and calculate the maximum speed and the braking curve of the train, wherein a respective cybersecurity system onboard unit may processes at least some of the incoming and outgoing data.

Figure 5:
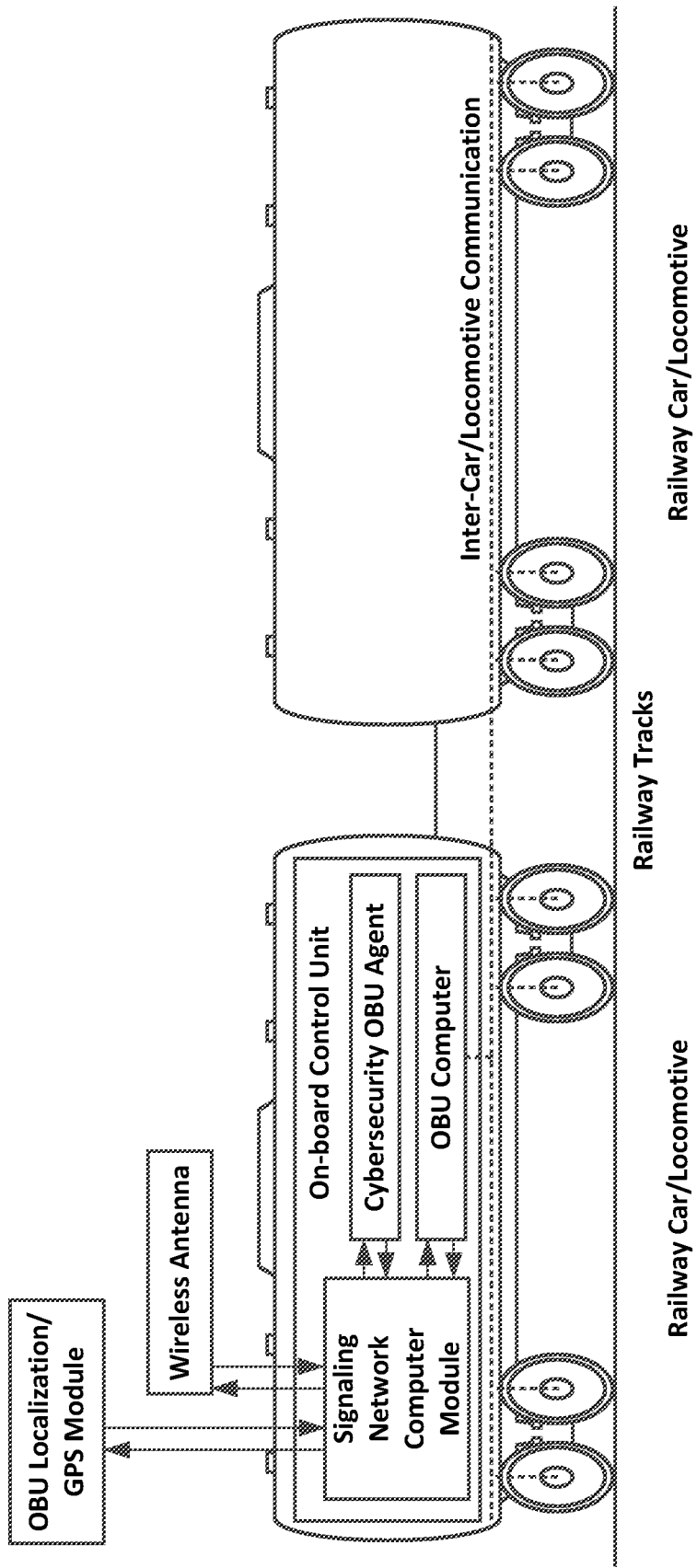
In FIG. 5, there is shown, in accordance with some embodiments of the present invention, a schematic layout of the main parts of a railway onboard unit (OBU) and the components, of an exemplary cybersecurity system, functionally associated with the onboard unit.

Reference is now made to FIG. 5, where there is shown, in accordance with some embodiments of the present invention, a schematic layout of the main parts of a railway onboard unit (OBU) and the components, of an exemplary cybersecurity system, functionally associated with the onboard unit.

In the figure, there are shown: a GPS or any other localization device; a wireless antenna, for example, based on cellular transmitter and receiver (e.g. GSM-R, GSM, LTE, Tetra, or any wireless channel); an on-board control unit; a cybersecurity system agent; a railroad cars or a locomotives; communication system that transfers railway/train computer data, internally, between train cars and components; a PTC (positive train control)/ETCS (European Train Control System) system/CBTC (Communications-based train control) or a similar railway protocol communication modules; and an onboard system computer.

According to some embodiments of the present invention, a Radio Block Control (RBC) unit/device in the signaling network may act as a centralized safety unit which, using radio connection (e.g. GSM-R, GSM, LTE, Tetra, or any wireless channel), may receive train position information and may, in response, send movement authorization and further information required by the train for its movement. The RBC may interact with the different components in the signaling network to obtain signaling-related information, route status, etc. It may also manage the transmission of selected trackside data and communicate with other/adjacent/neighboring RBCS.

Figure 6:
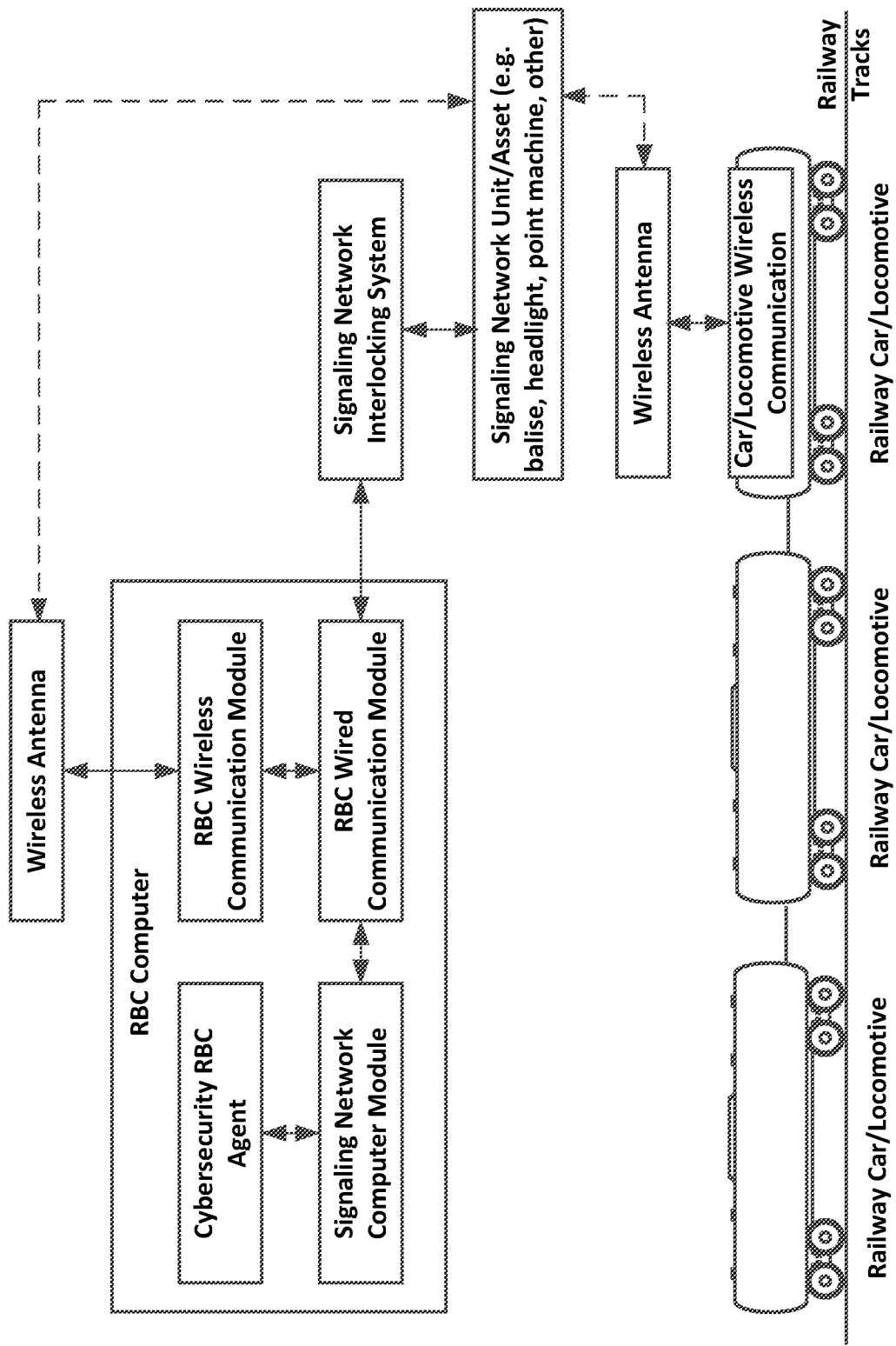
In FIG. 6, there is shown, in accordance with some embodiments of the present invention, a schematic layout of the main parts of a railway radio block control (RBC) and the components, of an exemplary cybersecurity system, functionally associated with the radio block control.

Reference is now made to FIG. 6, where there is shown, in accordance with some embodiments of the present invention, a schematic layout of the main parts of a railway radio block control (RBC) and the components, of an exemplary cybersecurity system, functionally associated with the radio block control.

In the figure, there are shown: a Radio Block Controller (RBC) computer unit or module connected to the signaling network; a cybersecurity system agent that compares the real-time network traffic to the estimated network traffic to/from the RBC—wherein detected 'real-time traffic' to 'estimated traffic' mismatches indicate anomalies or malicious activities inside the network and may trigger an alert; RBC module for wireless communication, for example radio reception and transmission circuitry; an antenna for wireless communication; an RBC module for wired communication; a signaling systems computer and communication module—such as a PTC, an ETCS, a CBTC, or a similar railway protocol communication module, of any other signaling system type; an interlocking system that manages different units/assets in the signaling system and thus ensures the safety of the trains; an asset/unit in the signaling system (e.g. a point machine, headlight or any unit in the signaling network); Railroad cars or a locomotives; and a railroad car or a locomotive module for wireless communication, including a radio transmitter and receiver.

According to some embodiments of the present invention, a system for providing cybersecurity to a railway operational system (signaling network), may implement a method/solution combining two main parts—a server and one or more agents/clients. The server may—based on received and/or collected information from multiple resources (e.g. scheduling systems, train management systems) and/or based on the monitoring of normal/typical functionality of signaling network units—calculate the estimated behaviors for one or more components/units in the signaling network.

Sets, of one or more such estimations may be referred to as 'policies'. The system server(s) may generate policies, for both the network (i.e. information, communication) related functionality and/or the operation functionality, for each or some of the different signaling network units.

Generated policies may be sent to corresponding field cybersecurity system agents/clients. Each system agent/client may then compare real-time information/communication traffic and operational behavior of the unit it monitors—to its respective policy received. The comparison enables the detection of abnormal or malicious behavior, based on detected comparison mismatches between the real time traffic and behavior of a given signaling network unit and its policy estimated traffic and behavior. The following, are descriptions, system dataflow diagram and method flowchart, of an exemplary policy generation process, in accordance with some embodiments.

According to some embodiments, policies may include both operation policies and network policies. The operation policy may include: (1) the expected operational (e.g. mechanical) behavior of the unit/element (e.g. times when a specific light should change to red/green), based on data from various systems such as unit behavior monitoring agents and/or resources data (e.g. scheduling data); and (2) the network policy may include: the expected network behavior of each unit/element (e.g. when it receives network packets, using what protocol and from what source).

According to some embodiments, data publishing and/or data resource access enabling servers and databases, may be regarded as monitored transportation control signaling network units. Based on the profiling of data and/or data publishing behavior of a given data resource, as monitored by a cybersecurity system behavior monitoring server or agent, one or more activity policy regulations or conditions—for other/downstream signaling network control/management units—may be generated.

Accordingly, signaling network units' policies, of a first set of one or more units, may be at least partially generated based on the monitored behavior of a second set of one or more other signaling network units, wherein the second set of units may include data resource(s)—publishing, broadcasting, multicasting and/or allowing access to—data indicative of the operational or communicational activity of one or more units in the first set of units.

According to some embodiments, publishing and/or accessible data resources regarded as monitored transportation control signaling network units, may for example include, but are not limited to: Transportation scheduling data resources, of the transportation network or of one or more other transportation networks at least partially coordinated therewith; train management system (TMS) data; 'Smart/Safe City' systems data; present/immediate cyber and malicious activity threats repositories; localization and navigation platforms'/system's data resources; and/or any other data resources publishing or allowing access to the behavior of the transportation network and units/elements thereof.

According to some embodiments, communications sent to/from transportation control units may be filtered or flagged by an artificial intelligence node monitoring various signals and/or data streams associated with functional points and units of the transportation network, wherein the functional points and units may at least partially include publishing and/or accessible data resources regarded as transportation control signaling network units.

According to some embodiments, the artificial intelligence node may include a neural network, wherein the neural network may be trained using signals and/or data streams—associated with functional points and units of the transportation network—which were collected during units' previous operation times in which no cyber or malicious events occurred.

According to some embodiments, the unit policies may combine to collectively create a solution for both OT related and IT related protection. These policies may be regularly updated and resent to the corresponding different cybersecurity agents in the field. Based on the policies, the integrity of the system may be determined and cyber threats in the network may be detected substantially in real-time.

According to some embodiments, a cyber event/threat may be classified at (i.e. as part of), or following to, its detection. The cybersecurity system server may: use the event/threat classification for referencing an event/threat remedies database and selecting a matching solution; and/or generate a custom event/threat remedy for the detected event/threat based on its specific characteristics. The selected remedy/solution may: prevent the cyber-attack attempt, produce a recommendation on how to solve it or minimize its effect, protect specific system components or assets and/or isolate the threat to limit its damage/spreading. For example, if a specific device/unit overloads the network (e.g. denial of service) and sends a lot of traffic, the recommendation may be to disconnect it from the network to avoid damage or connection losses to other units or network elements.

Figure 7A:
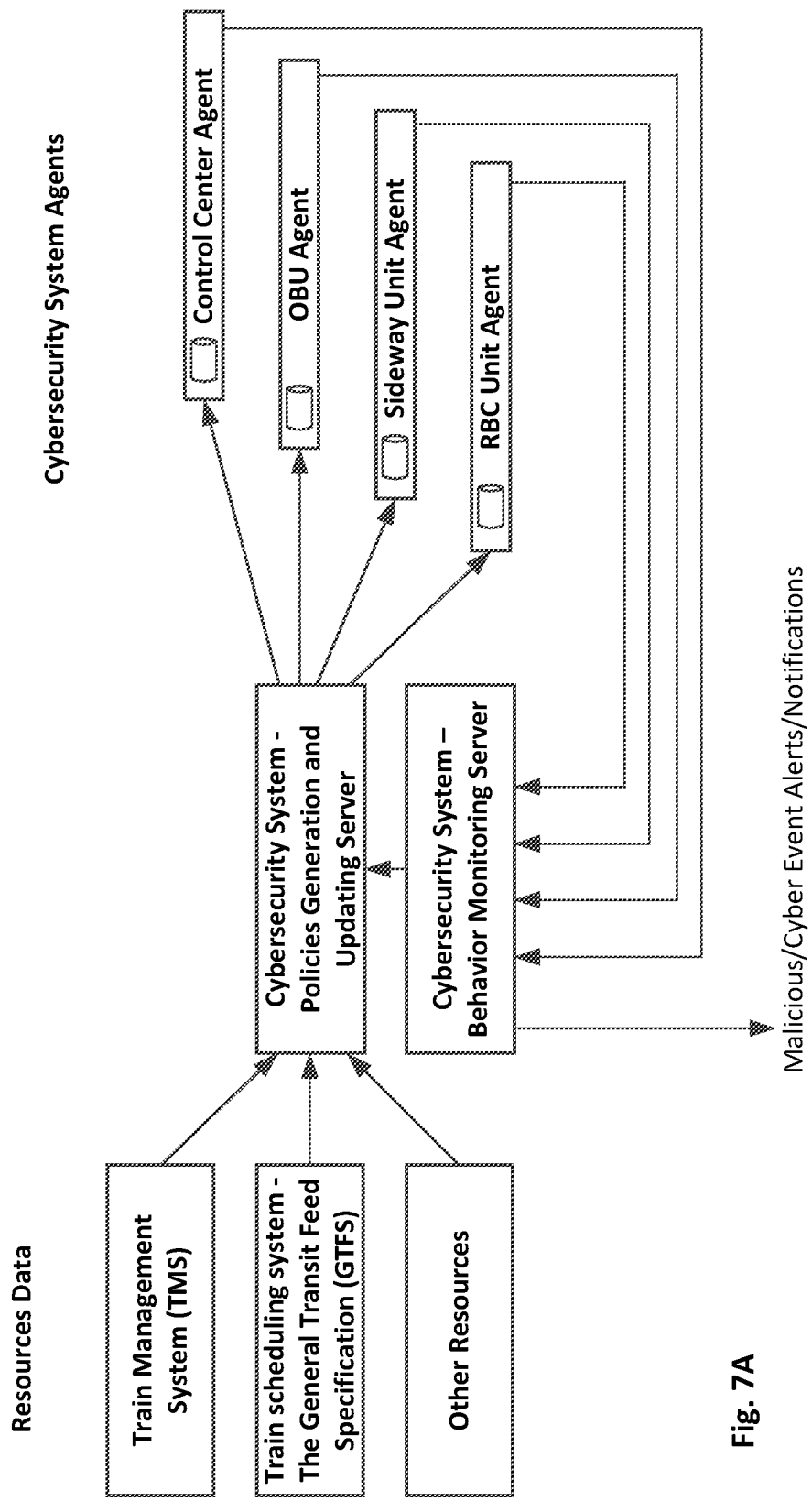
In FIG. 7A, there is shown, in accordance with some embodiments of the present invention, a dataflow diagram of an exemplary dataflow between transportation management network information resources, the cybersecurity system server and transportation management network units—as part of the generation of profiles and policies, and their propagation to respective transportation management network units.

Reference is now made to FIG. 7A, where there is shown, in accordance with some embodiments of the present invention, a dataflow diagram of an exemplary dataflow between transportation management network information resources, the cybersecurity system server and transportation management network units—as part of the generation of profiles and policies, and their propagation to respective transportation management network units.

In the figure, the following exemplary data resources are shown: (1) a Train Management System (TMS) for integrated management and monitoring of suburban train movements and signaling, as well as planning train routes, diversions, and introduction or withdrawal of rakes in service or any railway information management; this is used to receive initial and/or updated information about each train in the railway network; (2) a Train scheduling system—including, for example, General Transit Feed Specification (GTFS) which is a common format for public transportation schedules and associated geographic information—or any railway/transportation schedule information; and/or (3) Any other resource containing signaling network units functionality/operation indicative information, that may be analyzed to derive unit policy data, for example, a maintenance information repository/database may be used to anticipate "unexpected" commands to the signaling system; further shown is (4) a cybersecurity system server that collects information from the different resources and creates unique policies for different units/assets in the signaling system network (e.g. for: point machines, RBCs, onboard units); and (5) the unique policies generated, or updates thereof, being dispatched to their respective units/assets—for comparison to later real-time unit/asset information.

Figure 7B:
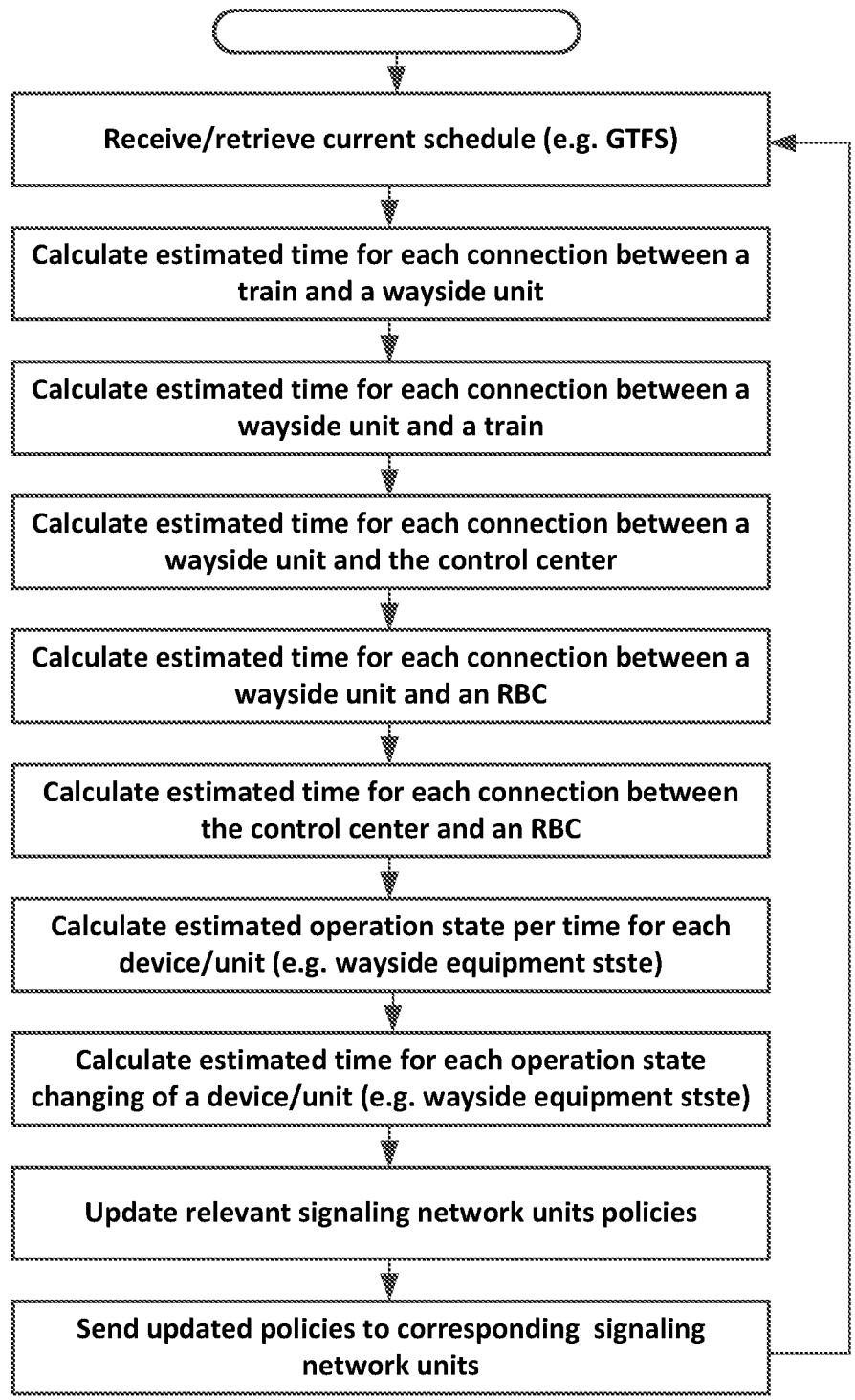
In FIG. 7B, there is shown, in accordance with some embodiments of the present invention, a flowchart of the main steps of an exemplary method for the generation of profiles and policies, for transportation management network units, based on scheduling information.

Reference is now made to FIG. 7B, where there is shown, in accordance with some embodiments of the present invention, a flowchart of the main steps of an exemplary method for the generation of profiles and policies, for transportation management network units, based on scheduling information.

Using the described resources, policies created utilizing the exemplified method, are then sent to their corresponding field cybersecurity agents/devices, that compare the 'real-time traffic/operation' (of each of their respectively monitored signaling network unit) to the 'estimated traffic/operation', as expressed/defined/described in its policy, for detecting abnormal behavior. In the exemplary figure, based on the scheduling information, the flowchart method, or an algorithm based thereof, calculates: the estimated time(s) of communication between the signaling network units/assets (e.g. train no. 1 will communicate with [will also pass over] eurobalis no. 2 at 12:30); and their estimated operation status at specific time points and/or during specific time periods/segments (e.g. switch is left/right now, light will be green/red for the following hour).

In the figure, the following steps are shown: (1) Cybersecurity system server receives the scheduling information (e.g. from the Train Management System) or any other scheduling system; (2) The server calculates the estimated time for each communication between a train and a wayside units (or any other unit/asset in the signaling system); (3) The server calculates the estimated time for each communication between a wayside unit and a train (or any other unit/asset in the signaling system); (4) The server calculates the estimated time for each communication between a wayside unit and, another wayside unit or a control center (or any other critical unit/asset in the signaling system); (5) The server calculates the estimated time for each communication between a wayside unit and another wayside unit or an RBC (or any other critical unit/asset in the signaling system); (6) The server calculates the estimated time for each communication between a control center and, a wayside unit or an RBC (or any other critical unit/asset in the signaling system); (7) The server calculates the estimated operation state/status, per time point/period, for each signaling network unit/device; (8) The server calculates the estimated time for each communication between a wayside unit and, another wayside unit or an RBC; (9) Update the policies in the database (e.g. Railway Management Network Units Policies DB); and (10) Send out new policies, each policy to its corresponding cybersecurity agent/client in the field/network.

Figure 8:
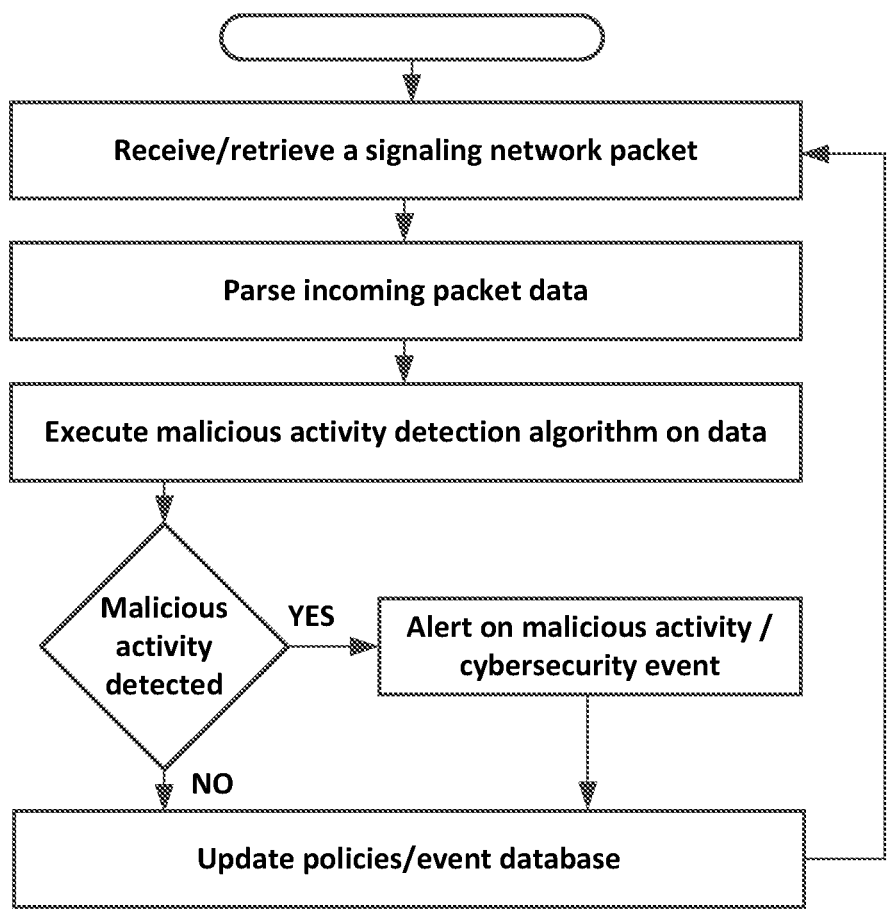
In FIG. 8, there is shown, in accordance with some embodiments of the present invention, a flowchart of the main steps of an exemplary method for the processing of packets communicated over a signaling system of a transportation management network, as part of the detection of malicious activity.

In FIG. 8, there is shown, in accordance with some embodiments of the present invention, a flowchart of the main steps of an exemplary method for the processing of packets communicated over a signaling system of a transportation management network, as part of the detection of malicious activity.

In the figure, the following steps are shown: (1) Initiate a process to find/detect malicious activity in the railway operation system's signaling network; (2) Receive a data packet from the signaling network; (3) Parse the received network data packet for cyber analysis; (4) Apply/execute a data analysis method/algorithm to find/detect malicious activity; (5) If a malicious activity was detected in the signaling system, alert/notify on it; (6) Update the relevant data—for example, new signaling network unit policy update—in the policies database, at least partially based on malicious activity detection results, for example, update the blacklist with details (e.g. the IP address) that a recognized attacker used; (7) End or repeat the process to find malicious activity in the signaling system.

Figure 9:
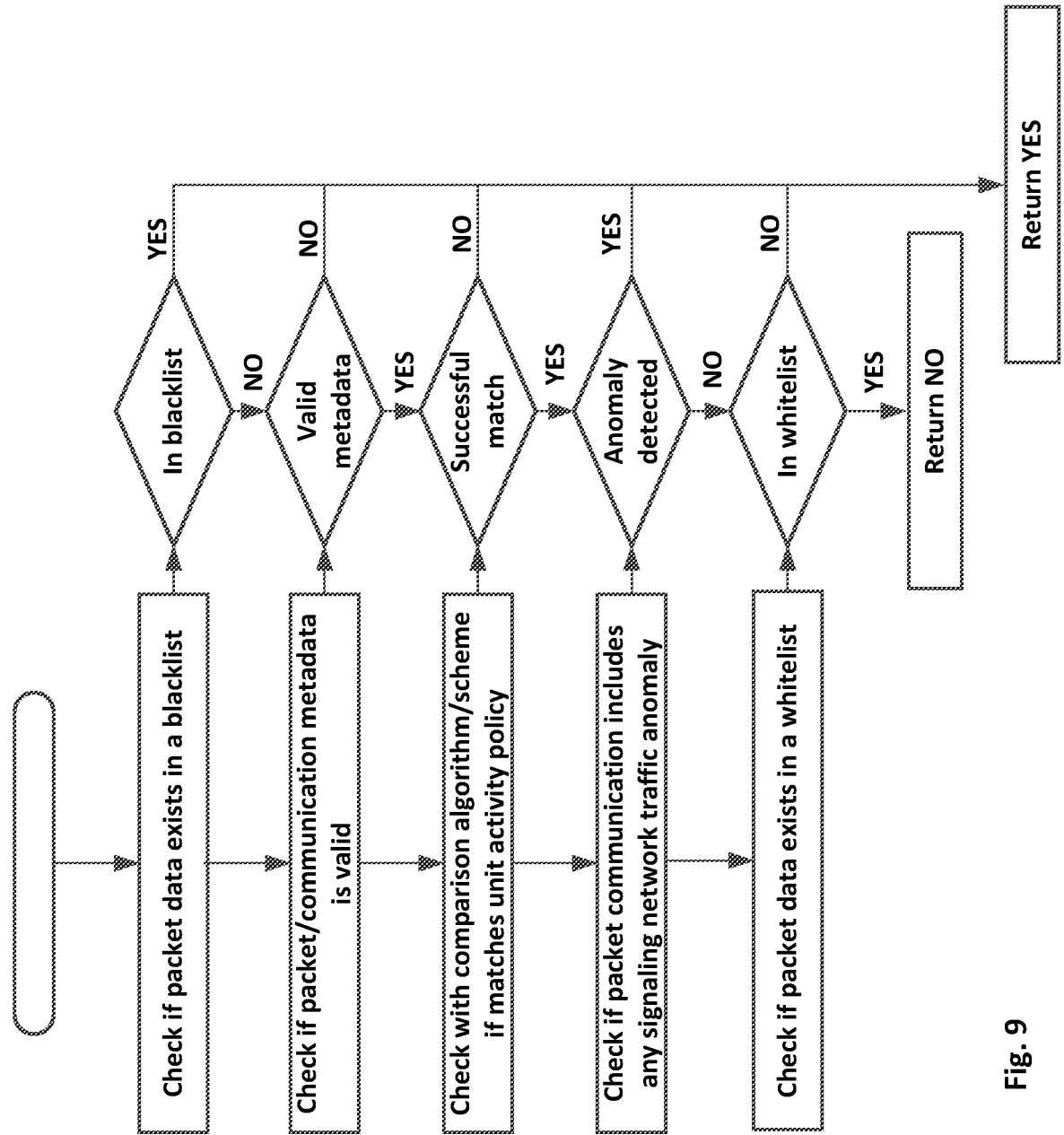
In FIG. 9, there is shown, in accordance with some embodiments of the present invention, a flowchart of the main steps of an exemplary method for the validation, and data anomaly detection, of packets communicated over a signaling system of a transportation management network, as part of the detection of malicious activity.

In FIG. 9, there is shown, in accordance with some embodiments of the present invention, a flowchart of the main steps of an exemplary method for the validation, and data anomaly detection, of packets communicated over a signaling network of a transportation management system, as part of the detection of malicious activity.

In the figure, the following steps are shown: (1) Initiate the algorithm (step (4) of FIG. 8) to detect malicious activity in the signaling system; (2) Check if (search for) any part of the parsed-packet/extracted-command exists in a blacklist; (3) Check if the metadata is suspected as malicious activity, for example, in the form of network protocol vulnerability exploits detected in the metadata (e.g. multiple acknowledgments, unwarranted ARP responses); (4) Compare the estimated, unit policy based, traffic; to real-time traffic and look-for/calculate-level-of correlation; (5) Detect anomaly(ies) in the network traffic of the railway operation system's signaling network; (6) Check if (search for) any part of the parsed-packet/extracted-command exists in a whitelist; and (7) If the output of step 2 and/or of step 5 is positive; and/or if the output to steps 3, 4 and/or 6 is negative—than (8A) return 'NO'—a suspicious behavior has been detected, generate/provide alert(s)/notification(s); else, (8B) return 'YES'—the packet is considered safe, return (not suspicious behavior/cyber threat).

The following are examples of packet, data and network communication validations, in accordance with some embodiments of the present invention:

According to some embodiments, an exemplary Light Configuration based network data validation may, for example, include a cybersecurity system agent/element monitoring/listening-to communications relayed (e.g. by one or more of the signaling network's RBCs (Radio Block Control) and/or its BOS (Back Office Server)/Control Center) to a specific railway network wayside light. Rail-control protocol layer data packets, in the monitored communication, may be parsed to extract commands arriving at the railway network wayside light and analyzed to understand specific commands that were sent.

The analyzed command may be compared to a pre generated operation profile/policy of the same railway network wayside light, wherein a mismatch between the expected command at the current time, as defined by the operation profile/policy, and the actual received command, may trigger an alert.

For example, a 'change the light to green' command, received by the railway network wayside light, at a time point/period when the profile/policy indicates the light should be/remain green, may indicate a potentially invalid command that may be associated with a cybersecurity related event. A responsive action may include the triggering of an alert or alert notification(s) and/or the aborting/ignoring/changing of the received command (i.e. light remains red).

According to some embodiments, an alert and/or a command abortion, related to a specific wayside element/agent may be triggered based on a profile/policy to command mismatch of the specific wayside element/agent and/or based on a profile/policy to command mismatch of another/other wayside element/agent. For example, a 'change the light to green' command may be aborted based on its mismatch to the profile/policy of the designated light; and/or based on its mismatch with the policy of another wayside element/agent. For example, the profile/policy of another wayside light—of a railway track intersecting with the track of the command designated light—may indicate that the light will be green for a following period of time. Executing the received command may thus cause both lights, of the two intersecting tracks, to be simultaneously green, which may result in a collision between trains riding over these two tracks.

Figure 10A:
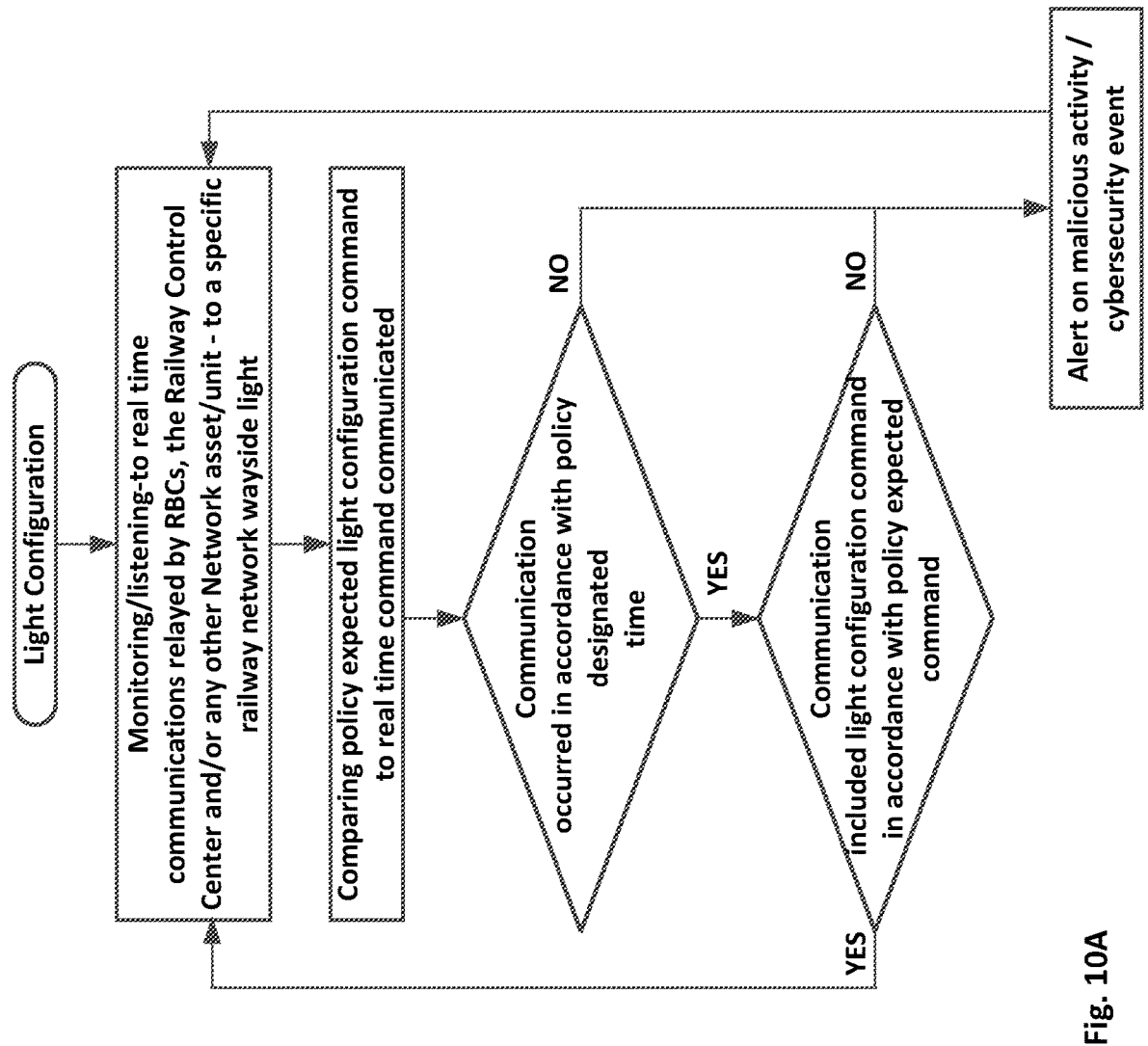
In FIG. 10A, there is shown, in accordance with some embodiments of the present invention, a flowchart of the main steps of a first exemplary validation process, wherein traffic light configuration commands, within packets communicated over a signaling system of a transportation management network, are utilized to validate the packets.

In FIG. 10A, there is shown, in accordance with some embodiments of the present invention, a flowchart of the main steps of a first exemplary validation process, wherein traffic light configuration commands, within packets communicated over a signaling system of a transportation management network, are utilized to validate the packets.

According to some embodiments, an exemplary 'Wayside unit' (e.g. Balise) to 'On Board Unit' Communication based network data validation may, for example, include a system agent/element monitoring/listening-to communications between a specific train's OBU and a specific balise. Based on a pre-generated functionality/operational policy of the specific train, it is known that the train is supposed to pass over the specific balise at a specific expected point in time, or within a specific time period; and to receive specific information from the balise (e.g. a speed change instruction).

A cybersecurity system's agent, monitoring the specific train's OBU communications (or the specific balise's communications) may, based on the pre-generated functionality/operational OBU/Wayside policy, expect an 'On Board Unit' to 'Wayside unit' communication at a particular time (i.e. train crossing balise time), which communication is expected to include specific information (e.g. a speed change instruction).

A responsive action may, for example, include the triggering of an alert or alert notification(s) and/or the issuing of a balise to OBU command (or a direct OBU command)—based on the balise policy expected, but not sent, command to the OBU (e.g. lower your speed to 60 km/h).

Figure 10B:
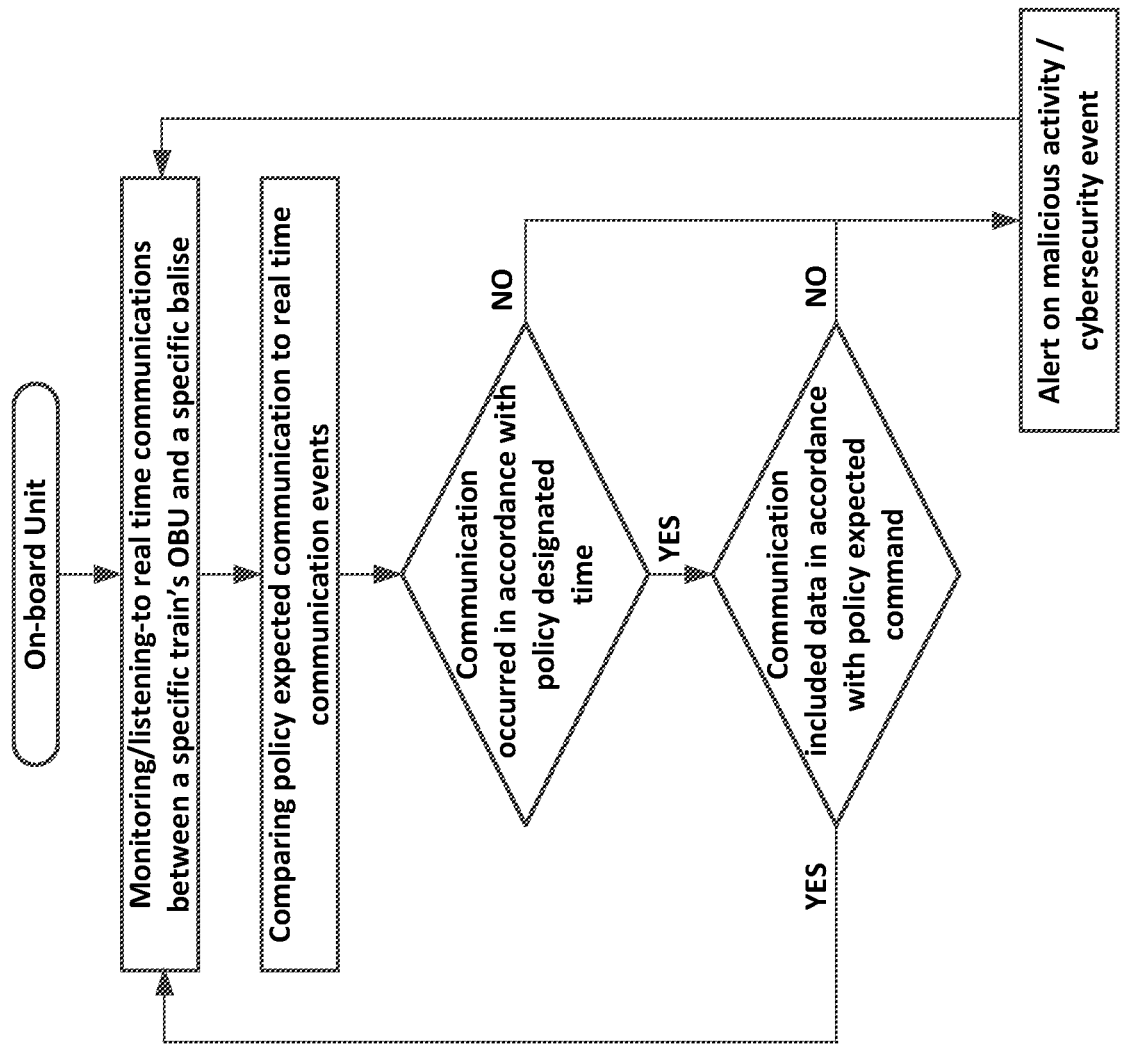
In FIG. 10B, there is shown, in accordance with some embodiments of the present invention, a flowchart of the main steps of a second exemplary validation process, wherein on-board to balise communication time and data, of/within packets communicated over a signaling system of a transportation management network, are utilized to validate the packets.

In FIG. 10B, there is shown, in accordance with some embodiments of the present invention, a flowchart of the main steps of a second exemplary validation process, wherein on-board to balise communication time and data, of/within packets communicated over a signaling system of a transportation management network, are utilized to validate the packets.

According to some embodiments, an exemplary Network Metadata based network data validation may, for example, include system agents/elements monitoring/listening-to communications between the control center of the railway operation system signaling network and a specific set of Wayside units. Based on a specific bandwidth(s) allocation/usage—general, or at a specifically selected time point(s)/period(s)/interval(s)—as defined by a pre-generated policy(ies) of the control center or wayside units, a deviation(s) from the expected communication bandwidth may be detected.

A responsive action—to an unexpected bandwidth deviation, or an abnormal (from what is defined in the policy) bandwidth, may, for example, include the triggering of an alert or alert notification(s).

Figure 10C:
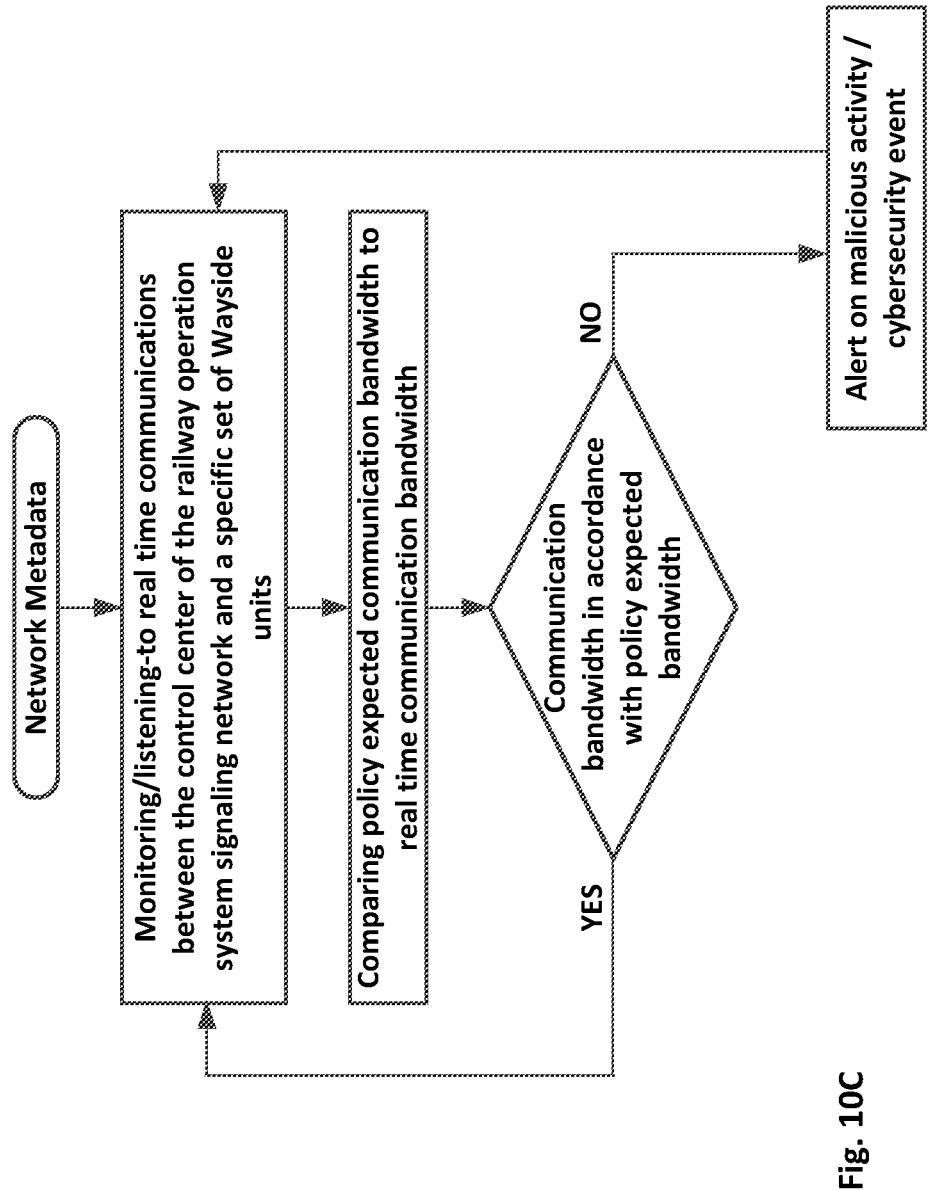
In FIG. 10C, there is shown, in accordance with some embodiments of the present invention, a flowchart of the main steps of a third exemplary validation process, wherein network metadata, relating to wayside units communication bandwidth characteristics, is utilized to validate packets, communicated over a signaling system of a transportation management network; and In FIG. 10D, there is shown, in accordance with some embodiments of the present invention, a flowchart of the main steps of a fourth exemplary validation process, wherein network behavior, relating to the source addresses of wayside units' received communications, is utilized to validate packets, communicated over a signaling system of a transportation management network.

In FIG. 10C, there is shown, in accordance with some embodiments of the present invention, a flowchart of the main steps of a third exemplary validation process, wherein network metadata, relating to wayside units communication bandwidth characteristics, is utilized to validate packets, communicated over a signaling system of a transportation management network.

According to some embodiments, an exemplary—Unexpected network behavior—based network data validation may, for example, include system agents/elements monitoring/listening-to wayside units' communications. Based on a set of expected IP addresses, or other communication network source addresses, from which a specific wayside unit, or any given wayside unit, should receive communications—as defined in its/their pre-generated policy—an IP address, or network source address (not listed in the policy), from which a wayside unit targeted communication has been received/monitored, may trigger a malicious activity/access attempt.

A responsive action—to an unexpected source address communication (from what is defined in the policy) may, for example, include the triggering of an alert or alert notification(s); and/or the issuance of instructions to ignore (i.e. not execute) commands associated-with/arriving from—unknown/not-in-policy source addresses (e.g. IP addresses).

Figure 10D:
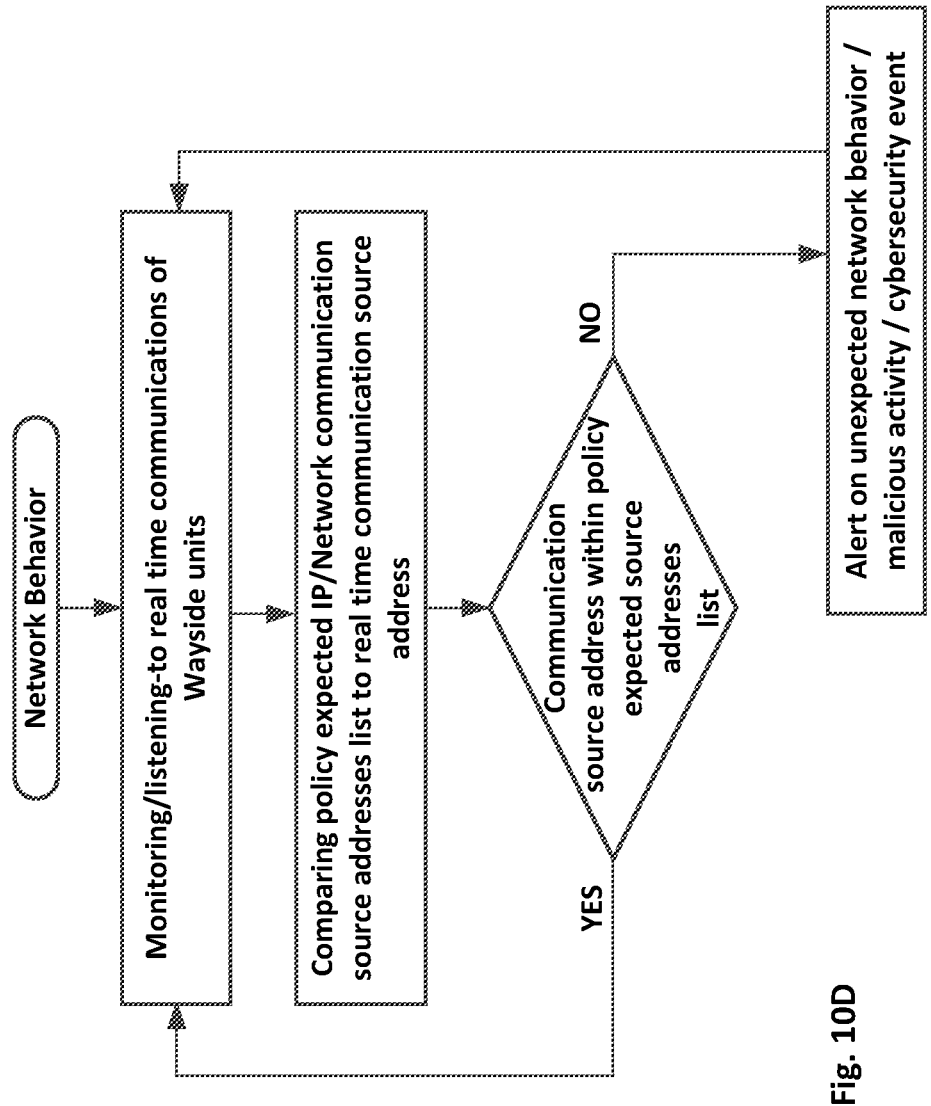

In FIG. 10D, there is shown, in accordance with some embodiments of the present invention, a flowchart of the main steps of a fourth exemplary validation process, wherein network behavior, relating to the source addresses of wayside units' received communications, is utilized to validate packets, communicated over a signaling network of a transportation management system.

According to some embodiments of the present invention, a secured transportation control network may comprise: (1) a distributed set of transportation network management units spread across different functional points of the transportation network, wherein each management unit is adapted to either monitor or regulate a condition of a respective segment of the transportation network, and wherein two or more management units communicate with each other to perform transportation network management in a coordinated manner; (2) at least one network management unit agent functionally coupled to a respective network management unit and adapted to monitor communications of the respective management unit; (3) a behavior monitoring server adapted to generate a behavior profile for a network management unit based on information provided by an agent functionally coupled to the network management unit; (4) a communication policy generator to generate for at least one network management unit a communication policy based on behavior profiles of network management units with which the at least one network management unit communicates, wherein the communication policy is sent to an agent application functionally coupled to the at least one network management unit.

According to some embodiments, the respective policy received by an agent may be used by the agent to filter and/or flag communications not complying with the respective policy.

According to some embodiments, the communication policy generator may constantly update individual agent policies based on new behavior profiles of old and new management units.

According to some embodiments, the communication policy generator may constantly update individual agent policies based on heuristics.

According to some embodiments, the heuristics based updates to individual agent policies may relate to the transportation network reconfiguration or the base network configuration file.

According to some embodiments, the heuristics based updates to individual agent policies may relate to data in a scheduling database of the transportation network.

According to some embodiments, the agents may also provide unit behavior info to the behavior monitoring server.

According to some embodiments, agents provided unit behavior info may include at least one result of a comparison between a regulation in the communication policy of an agent monitored unit and the real time communication behavior of that unit.

According to some embodiments, the agents may act to protect their respective management units from bad communications.

According to some embodiments, as part of protecting its respective management unit, a given agent may prevent specific data, conflicting with a regulation of the respective unit's policy, from arriving at the unit.

According to some embodiments of the present invention, a method for securing a transportation control network may comprise: (1) distributing a set of transportation network management units across different functional points of the transportation network, wherein each management unit is adapted to either monitor or regulate a condition of a respective segment of the transportation network, and wherein two or more management units communicate with each other to perform transportation network management in a coordinated manner; (2) monitoring the communications of at least one of the management units using respective network management unit agents functionally coupled to each of the monitored management units; (3) generating a behavior profile for a network management unit based on information provided by an agent functionally coupled to the network management unit; (4) generating for at least one network management unit a communication policy based on behavior profiles of network management units with which the at least one network management unit communicates; and (5) sending the communication policy to an agent functionally coupled to the at least one network management unit.

According to some embodiments, the method may further comprise using a respective policy received by an agent to filter and or flag communications not complying with the respective policy.

According to some embodiments, the method may further comprise updating individual agent policies based on new behavior profiles of old and new management units.

According to some embodiments, updating individual agent policies may include applying heuristics.

According to some embodiments, applied heuristics may relate to the transportation network reconfiguration or the base network configuration file.

According to some embodiments, applied heuristics may relate to data in a scheduling database of the transportation network.

According to some embodiments, the method may further comprise providing, to a monitoring server, management unit behavior info.

According to some embodiments, the method may further comprise, including at least one result of a comparison between a regulation in the communication policy of an agent monitored management unit and the real time communication behavior of that unit.

According to some embodiments, the method may further comprising comprise, protecting management units from bad communications.

According to some embodiments, the method may further comprise, as part of protecting management units, preventing specific data, conflicting with a regulation of a unit's policy, from arriving at the unit.

According to some embodiments of the present invention, a railway transportation network may comprise: (1) at least one network control unit located at a functional point of the network and adapted to change configuration of the functional point of the network in response to receiving one or more communications from other units of the network; and (2) agents, each functionally coupled to one of the at least one network control unit and adapted to filter or flag communications sent to the at least one control unit, wherein each of the agents functions in accordance with a respective control unit policy file generated by an artificial intelligence node monitoring various functional points and units of the transportation network.

According to some embodiments, the artificial intelligence node of the railway transportation network may constantly update the unit policy files based on further monitoring of functional points or of old and new units of the transportation network.

According to some embodiments, the agents may also provide unit behavior info to a behavior monitoring server, wherein provided unit behavior info includes at least one result of a comparison between a communication regulation, of the unit, in the unit policy file generated by the artificial intelligence node and the real time monitored communication behavior of that unit.

According to some embodiments, the agents may also act to protect their respective management units from a given communication, upon a mismatch being found in a comparison between—one or more characteristics of the given communication and, one or more communication regulations, of the target unit to which the given communication was sent, as indicated in the unit policy file generated by the artificial intelligence node.

According to some embodiments, the one or more compared characteristics of the given communication may include: (1) the sending time of the communication, (2) the arrival time of the communication, or (3) specific data sent as part of the communication.

The subject matter described above is provided by way of illustration only and should not be constructed as limiting. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A cyber defense system for a computer managed transportation network, said system comprising:
   at least one processor; and
   at least one agent stored in a memory and executable by the at least one processor, the at least one agent:
   communicate with an on-board controller of one of at least one transportation network vehicles wherein said agent is
      adapted to monitor or regulate vehicle functional-change communications, sent to the on-board controller of its coupled vehicle from on-board controllers of other vehicles or from control units of the transportation network, in accordance with a respective transportation network vehicle policy file
   which is at least partially generated by an artificial intelligence node monitoring various vehicles of the transportation network.

2. A cyber defense system for a computer managed transportation network, said system comprising:
   at least one processor; and
   at least one agent stored in a memory and executable by the at least one processor, the at least one agent:
   communicate with an on-board controller of one of at least one transportation network vehicles wherein said agent is
      adapted to monitor or regulate vehicle functional-change communications, sent to the on-board controller of its coupled vehicle from on-board controllers of other vehicles or from control units of the transportation network, in accordance with a respective transportation network vehicle policy file policy file which is at least partially generated by a monitoring node or server receiving transportation network vehicles' activity data from said agents, wherein policy file generation includes behavioral pattern processing to identify specific expected behavioral patterns within the received activity data.

3. A cyber defense system for a computer managed transportation network, said system comprising:
- at least one processor; and
- at least one agent stored in a memory and executable by the at least one processor, the at least one agent:
- communicate with one of at least one transportation network control units located at, and adapted to change a configuration of, functional points of the transportation network wherein said agent is
  - adapted to monitor or regulate functional point configurational-change communications, sent to its coupled transportation network control unit from other control units of the transportation network, in accordance with a respective transportation network control unit policy file which is at least partially generated by an artificial intelligence node monitoring various functional points and control units of the transportation network.

4. The cyber defense system of claim 3, wherein said artificial intelligence node constantly updates the control unit policy files based on further monitoring of functional points or of old and new control units of the transportation network.

5. The cyber defense system of claim 3, wherein said agents also provide control unit behavior info to a behavior monitoring server, wherein provided control unit behavior info includes at least one result of a comparison between a communication regulation, of the control unit, in the control unit policy file generated by said artificial intelligence node and the real time monitored communication behavior of that control unit.

6. The cyber defense system of claim 5, wherein said agents also act to protect their respective control units from a given communication, upon a mismatch being found in a comparison between-one or more characteristics of the given communication and, one or more communication regulations, of the target control unit to which the given communication was sent, as indicated in the control unit policy file generated by said artificial intelligence node.

7. The cyber defense system of claim 6, wherein the one or more compared characteristics of the given communication include: (1) the sending time of the communication, (2) the arrival time of the communication, or (3) specific data sent as part of the communication.

8. The cyber defense system of claim 6, wherein said agents act to protect their respective control units from the given communication by preventing its arrival at the control unit(s).

9. The cyber defense system of claim 8, wherein said agents prevent the arrival of the given communication at the control unit(s) by blocking or hijacking data packets of the given communication, or by emulating a control unit sink.

10. The cyber defense system of claim 6, wherein said agents act to protect their respective control units from the given communication by alerting its arrival, or its upcoming arrival, at the control unit(s).

11. The cyber defense system of claim 3, wherein the training data for said artificial intelligence node generating the control unit policy file, at least partially includes signals or data streams collected from functional points and control units of the transportation network, during previous transportation network operation times determined to include no cyber or malicious events.

12. A method for cyber defense of a computer managed transportation network, said method comprising:
- communicatively coupling at least one agent comprised of machine executable code running on digital circuits to at least one of one or more transportation network control units located at, and adapted to change a configuration of, a functional point of the network; and
- monitoring or regulating functional point configurational-change communications sent to the at least one network control units, wherein communications to each control unit are monitored or regulated by its communicatively coupled agent in accordance with a respective control unit policy file which is at least partially generated by an artificial intelligence node monitoring various functional points and control units of the transportation network.

13. The cyber defense method of claim 12, further comprising constantly updating the control unit policy files based on further monitoring of functional points or of old and new control units of the transportation network.

14. The cyber defense method of claim 12, further comprising providing control unit behavior info to a behavior monitoring server, wherein provided control unit behavior info includes at least one result of a comparison between a communication regulation, of the control unit, in the control unit policy file generated by the artificial intelligence node and the real time monitored communication behavior of that control unit.

15. The cyber defense method of claim 14, further comprising protecting control units from a given communication, upon a mismatch being found in a comparison between-one or more characteristics of the given communication and, one or more communication regulations of the target control unit to which the given communication was sent, as indicated in the control unit policy file generated by the artificial intelligence node.

16. The cyber defense method of claim 15, wherein the one or more compared characteristics of the given communication include: (1) the sending time of the communication, (2) the arrival time of the communication, or (3) specific data sent as part of the communication.

17. The cyber defense method of claim 15, wherein protecting control units from a given communication includes preventing its arrival at the control unit(s).

18. The cyber defense method of claim 17, wherein preventing the arrival of the given communication at the control unit(s) is executed by blocking or hijacking data packets of the given communication, or by emulating a control unit sink.

19. The cyber defense method of claim 15, wherein protecting control units from a given communication includes alerting its arrival, or its upcoming arrival, at the control unit(s).

* * * * *